US011722412B1

(12) United States Patent
Massaguer

(10) Patent No.: US 11,722,412 B1
(45) Date of Patent: Aug. 8, 2023

(54) DYNAMICALLY MANAGING CONNECTION PARAMETERS AMONG MULTIPLE COMPUTING DEVICES

(71) Applicant: Amazon Technologies, Inc., Seattle, WA (US)

(72) Inventor: Daniel Massaguer, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/034,666

(22) Filed: Sep. 28, 2020

(51) Int. Cl.
*H04L 67/141* (2022.01)
*H04L 47/12* (2022.01)
*H04L 47/11* (2022.01)
*H04L 69/163* (2022.01)

(52) U.S. Cl.
CPC ............ *H04L 47/12* (2013.01); *H04L 47/11* (2013.01); *H04L 67/141* (2013.01); *H04L 69/163* (2013.01)

(58) Field of Classification Search
CPC ....... H04L 47/12; H04L 67/141; H04L 47/11; H04L 69/163
See application file for complete search history.

(56) References Cited

U.S. PATENT DOCUMENTS

| 5,097,484 A | 3/1992 | Akaiwa | |
|---|---|---|---|
| 6,757,250 B1* | 6/2004 | Fayad | H04L 12/2856 370/235.1 |
| 7,389,462 B1* | 6/2008 | Wang | H04L 1/188 714/748 |
| 7,877,113 B2 | 1/2011 | Kish et al. | |
| 8,107,369 B2* | 1/2012 | Sagfors | H04L 47/32 370/230 |
| 9,882,812 B2* | 1/2018 | Gottlib | H04L 47/14 |
| 9,954,776 B2* | 4/2018 | Burgess | H04L 47/122 |
| 10,187,307 B2 | 1/2019 | Kish et al. | |
| 10,305,721 B1* | 5/2019 | Binns | H04N 21/632 |
| 10,594,596 B2* | 3/2020 | Scahill | H04L 69/14 |
| 10,873,533 B1* | 12/2020 | Ismailsheriff | H04L 47/2441 |
| 10,917,352 B1* | 2/2021 | Hanes | H04L 47/323 |
| 11,050,587 B1* | 6/2021 | Norbutas | H04L 12/4641 |
| 2005/0055406 A1* | 3/2005 | Singhai | H04L 69/162 709/206 |

(Continued)

*Primary Examiner* — Jason D Recek
(74) *Attorney, Agent, or Firm* — Knobbe, Martens, Olson & Bear, LLP

(57) ABSTRACT

Features are disclosed for dynamically managing connection parameters for multiple computing devices configured to transmit and receive data based on corresponding connection parameters. A computing device can receive multiple connection parameters corresponding to multiple distinct connections. The computing device can determine a minimum transmission parameter based on the multiple connection parameters. The computing device can set a local transmission parameter and a local reception parameter based on the minimum transmission parameter. The computing device may use the local transmission parameter and the local reception parameter for each connection. The computing device may provide the local reception parameter to each of the multiple computing devices. In some embodiments, the multiple computing devices may set a corresponding reception parameter and a corresponding transmission parameter based on the local reception parameter.

20 Claims, 8 Drawing Sheets

(56) References Cited

U.S. PATENT DOCUMENTS

| | | | |
|---|---|---|---|
| 2006/0190612 A1* | 8/2006 | Kahol | H04L 69/163 |
| | | | 709/230 |
| 2014/0122732 A1* | 5/2014 | Duan | H04L 67/14 |
| | | | 709/228 |
| 2017/0012868 A1* | 1/2017 | Ho | H04L 1/1858 |
| 2017/0324834 A1* | 11/2017 | Hodge | H04L 12/287 |
| 2018/0123959 A1* | 5/2018 | Maslak | H04L 47/27 |
| 2018/0288165 A1* | 10/2018 | Fransazov | H04L 67/125 |
| 2018/0338264 A1* | 11/2018 | Kim | H04L 67/568 |
| 2019/0052711 A1* | 2/2019 | Kharlanau | H04L 67/1061 |
| 2020/0092206 A1* | 3/2020 | Lopez Serrano | H04L 47/15 |

* cited by examiner

DYNAMICALLY MANAGING CONNECTION PARAMETERS AMONG MULTIPLE COMPUTING DEVICES

BACKGROUND OF THE INVENTION

Networks include computing devices that are communicating data over the network. A computing device can maintain various variables that are associated with how the computing device may communicate data with another computing device. In some implementations, such as those using transmission control protocol ("TCP"), a particular connection of a computing device is associated with a congestion window ("CWND") that determines the amount of data that the computing device can send over the network to a destination computing device without receiving an acknowledgement of receipt of the data by the destination computing device. The connection of the computing device is also associated with a receiver window ("RWND"), which is a receiver-side limit on the amount of unacknowledged data that the computing device can receive (e.g., based on a buffer size of the computing device). A source computing device can communicate with a destination computing device and receive an RWND from the destination computing device, the RWND associated with the particular destination computing device. The source computing device can also dynamically compute the CWND for the connection to the destination computing device based on network conditions. The source computing device may then adjust the amount of unacknowledged data that the source computing device communicates to the destination computing device based on a minimum of the RWND of the destination computing device and the CWND of the source computing device.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
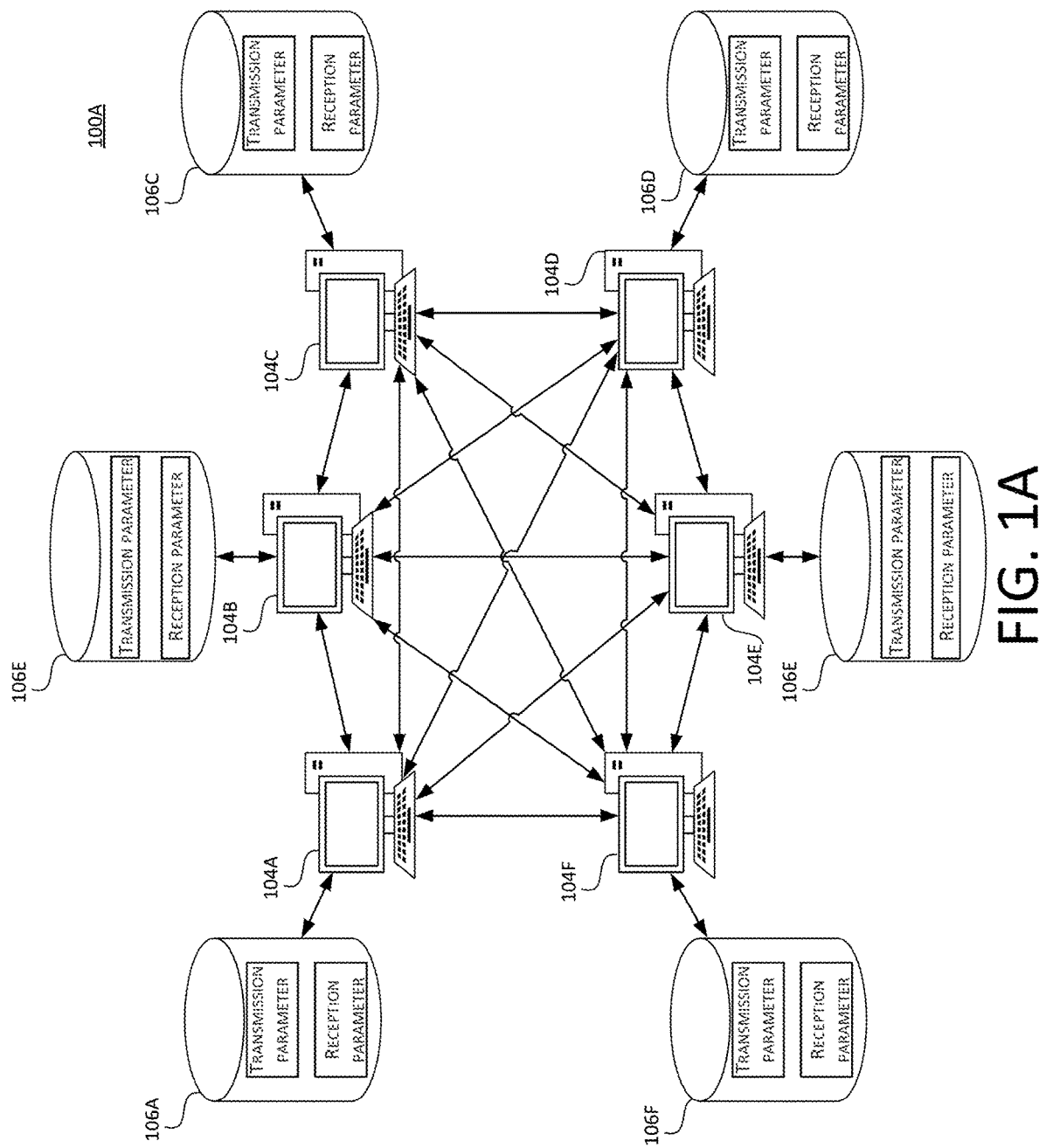
FIG. 1A depicts a schematic diagram of an example networked environment according to some embodiments.

The present disclosure generally relates to managing network connections between multiple communicating computing devices (e.g., peers, nodes, servers, proxy servers, etc.) participating in a network communication session. Generally described, a network communication session, or "session" for short, may be formed when multiple computing devices collectively use multiple network connections to exchange data for a common purpose. Typically, sessions are formed to manage substantially simultaneous or otherwise synchronized data exchange between multiple computing devices, such as during a video conference, a multiplayer game, a collaborative meeting, or the like. Multiple connections in the same session may exist between pairs or other groups of computing devices communicating over the network. For example, a first computing device may maintain a first connection with a second computing device and a second connection with a third computing device. Each connection may be associated with a set of connection parameters used to govern the transmission of data over the connection. A connection parameter may indicate the amount of data that the source computing device is permitted to send before receiving an acknowledgement, the amount of data that the destination computing device can receive before a buffer at the destination overflows, or any other parameter related to the computing devices communicating via the connection. For example, a connection parameter may be a CWND of the source device transmitting data or an RWND of the destination device to which data is being transmitted. Typically, a source device may periodically increase connection parameters associated with a particular connection in order to determine if a connection to a given destination device associated with the particular connection can handle increased connection parameters. A destination device may indicate to the source device, or the source device may otherwise determine, when congestion (e.g., a loss of data) has occurred or a threshold was exceeded by a previous transmission. Such an occurrence may cause the source device to further adjust connection parameters for a particular connection.

Further, each connection can be managed collectively with other connections of the session as indicated by a session identifier. For example, a session may be indicated by a session identifier that is associated with each of the connections included in the same session. The session identifier may be a string of numeric, alphabetic, or alphanumeric characters or symbols. For example, the session identifier may be a string of numbers such as "1233252." The session identifier may be unique and may be based on the corresponding session and connections comprising the session.

Upon initialization of the connections of a session, individual connections between computing devices may be associated with separate and potentially disparate connection parameters. To provide a uniform or substantially uniform experience across each of the connections between each computing device in the session, a uniform or substantially uniform connection parameter (e.g., a uniform CWND, a uniform RWND) may be established for the computing devices and connections in the session. The uniform connection parameter for all computing devices in the session may be referred to as a "session connection parameter." One or more computing devices participating in the session may establish the session connection parameter by comparing connection parameters received from multiple other computing devices participating in the session. A computing device may receive one or more of a reception parameter (e.g., RWND) or a transmission parameter (e.g., CWND) from each computing device or a subset thereof (e.g., via a gossip protocol) and establish a session connection parameter, such as a minimum transmission parameter, based on the one or more of the reception parameter or transmission parameter. Connections between the multiple computing devices are then maintained according to the session connection parameter even where individual connections may be capable of using a connection parameter associated with higher bandwidth or other metric of higher perceived quality. For example, the first connection between the first computing device and the second computing device and the second connection between the first computing device and the third computing device are both maintained according to the session connection parameter, which may correspond to the minimum observed CWND or RWND of all connections in the session even though other connections are capable of performing according to a connection parameter associated with greater CWND or RWND. As a result, computing devices can share the same experience, creating a uniform experience across the session.

In conventional systems, different connection parameters are managed for each of the separate connections in a session. This may provide an unequal or otherwise unsatisfactory experience for certain computing devices based on their individual connection and corresponding connection parameters. For example, a first connection between a first computing device and a second computing device may be a better connection (i.e., may be faster, more stable, or otherwise provide a better experience) than a second connection between the first computing device and a third computing device. This may be due to unique constraints associated with the third computing device such as physical device limitations, connection limitations, or other limitations including limitations that may seem arbitrary or random. Such a difference in connections may lead to the second computing device and the third computing device having vastly different experiences than each other, and the first computing device have different experiences communicating with the other two devices. For example, the second computing device may have a high quality connection (i.e., a seamless connection) with the first computing device while the third computing device may have a low quality connection (i.e., a connection that requires a significant amount of buffering) with the first computing device. Such a disparity in experiences between computing devices may be disadvantageous in certain situations. For example, when the first computing device is a server and the second computing device and the third computing device are communicating with the server in order to play a game, it may not be desirable for one computing device to have a superb experience while the other computing device has an inadequate experience. In competitive environments, such a difference can lead to significant issues (e.g., unfair advantages, disjointed experiences, etc.).

Some aspects of this disclosure address the problems noted above, among others, by establishing a session between multiple computing devices in order to determine a session connection parameter (e.g., a minimum transmission parameter) and use the session connection parameter to manage connections among the computing devices in session. Each computing device may establish the session via a session identifier (a "session ID"). Each computing device may exchange the session ID with other computing devices during an initial connection establishment. For instance, the session may be established during an initial transmission control protocol ("TCP") handshake where a computing device provides the session identifier for verification during the TCP handshake. In some embodiments, subsequent communications may also include, reference, or otherwise be associated with the session ID so that they can be positively identified as being part of the session. For example, the session ID may be included in the TCP header.

Further aspects of this disclosure relate to propagating one or more connection parameters between multiple computing devices participating in a session. A particular computing device may advertise connection parameters associated with the particular computing device to other computing devices participating in the session. The particular computing device may advertise these connection parameters in order to indicate a quantity of data that the particular device can either receive or transmit at a given time period. For example, the connection parameters may indicate a quantity of buffer space available at the computing device for receiving data and/or a quantity of unacknowledged data that the computing device can send before acknowledgement. Computing devices that receive these connection parameters may utilize the connection parameters in order to control congestion in a given connection between computing devices. The devices to which a particular computing device forwards connection parameters may include all devices with which the particular computing device communicates, or the devices may be determined based on certain protocols, such as a gossip protocol. The selection of the one or more computing devices may be in a random manner. Based on the selected protocol, each computing device may select one or more computing devices and forward connection parameters associated with the particular computing device to the one or more computing devices. Further, each computing device may forward connection parameters to a server or a proxy server. The computing device may forward the connection parameters in a signaling packet or as a part of any other packet.

Some aspects of this disclosure relate to establishing connection parameters for computing devices in multiple architectures such as a peer-to-peer architecture, a server-node architecture, or a proxy server-node architecture. In a peer-to-peer architecture, connections are established between pairs of nodes and a given node communicates with multiple other nodes using multiple such connections. Each node may communicate connection parameters associated with that particular node to multiple nodes. For example, a given node may communicate a reception parameter (e.g., an RWND) to each other node with which the given node communicates. Similarly, each node may receive a reception parameter from each of the nodes connected to the given node. In addition to the exchange of reception parameters, each node may communicate its transmission parameter (e.g., a CWND) to one or more other nodes participating in the session. In this way, the nodes have additional information about the other nodes and connections in the session, such as the congestion that the other nodes are experiencing. Thus the nodes may dynamically adjust their own connection parameters based on a more complete picture of the session. For example, each node can then compare multiple received connection parameters (e.g., CWNDs from other nodes) in order to determine a connection parameter value that may be used across all of the node's connections, such as a minimum transmission parameter (e.g., a minimum CWND). By establishing a minimum transmission parameter, the node can ensure that each of the connections between the node and other nodes are restricted by the same connection parameter. Further, the node can determine a reception parameter value (e.g., an RWND) that may be used across all of the node's connections based on the minimum transmission parameter. The node may provide its updated reception parameter to the other nodes with which it communicates, thereby providing additional regarding the transmission parameter because the node's reception parameter is updated based on the minimum transmission parameter that it determined. Each node may periodically receive connection parameters in order to update the minimum transmission parameter to ensure that the minimum transmission parameter is adapted to the slowest connection. In this way, the connection parameters of the session are determined holistically, rather than merely being managed connection-by-connection, because the nodes participating in the session exchange connection information and collectively converge on a session connection parameter.

Some aspects of this disclosure relate to establishing uniform connection parameters for nodes in a server-node architecture. In a server-node architecture, each node communicates with a server (e.g., a centralized media server). Each node may communicate connection parameters associated with the particular node (e.g., RWNDs) to the server. The server can compare the connection parameters in order to determine a session connection parameter to use for all of the server's connections, such as a minimum transmission parameter (e.g., CWND) that is equal to or derived from the minimum of all node reception parameters. The server can then use the minimum transmission parameter to communicate with each node, ensuring that the multiple connections between the server and each node are uniform. Further, the server can determine a reception parameter (e.g., an RWND) based on the minimum transmission parameter. The server may provide the reception parameter to each node. Each node can then manage its transmissions to the server based on the server's reception parameter. The server may periodically receive connection parameters from the nodes (e.g., with each communication received from the nodes, on a predetermined or dynamically-determined schedule, etc.) in order to update the minimum transmission parameter to ensure that the minimum transmission parameter continues to be adapted to the slowest connection.

Further aspects of this disclosure relate to establishing connection parameters for nodes in a proxy server-node architecture. In a proxy server-node architecture, a proxy server is in communication with a node and a server, the proxy server forwarding data between the node and the server. The proxy server may receive connection parameters from the node and from the server. The proxy server can compare connection parameters for the separate connections with the node and the server in order to determine a session connection parameter, such as a minimum transmission parameter. The proxy server can then use the session connection parameter to communicate with the node and the server. By using the session connection parameter to communicate with the node and the server, the proxy server can ensure that the separate connections are operating under the same or similar constraints. The proxy server may further determine its own reception parameter based on the session connection parameter and provide the reception parameter to both the node and the server. The node and the server may use the reception parameter to manage transmission of data to the proxy server. The proxy server may periodically update the minimum transmission parameter based on received connection parameters from one or more of the node and the server.

Various aspects of the disclosure will now be described with regard to certain examples and embodiments, which are intended to illustrate but not limit the disclosure. Although aspects of the embodiments described in the disclosure will focus, for the purpose of illustration, on a peer-to-peer configuration, a server-node configuration, or a proxy server-node configuration, one skilled in the art will appreciate that the techniques disclosed herein may be applied to any number of architectures or configurations of computing devices. For example, a computing device may be implemented in a thin node network architecture.

FIG. 1A illustrates an example environment 100A in which a session-based network connection control mechanism may be implemented according to some embodiments, enabling for the regulation of multiple connections in the same session according to uniform connection parameters. The example environment 100A contains nodes 104A, 104B, 104C, 104D, 104E, and 104F that are each connected and communicating over a network (not shown in FIG. 1A). Individual nodes 104A, 104B, 104C, 104D, 104E, and 104F refer to computing devices or systems that compute, assemble, store correlate, or otherwise process information. A node 104A, 104B, 104C, 104D, 104E, and/or 104F can include, but is not limited to, a personal computer, server computer, laptop device, multiprocessor system, microprocessor-based system, network PC, minicomputer, mainframe computer, or a distributed computing environment that includes any of the above systems or the like.

Each node 104A, 104B, 104C, 104D, 104E, and 104F includes, is connected to, or is in communication with a respective data store 106A, 106B, 106C, 106D, 106E, and 106F. Each data store 106A, 106B, 106C, 106D, 106E, and 106F maintains connection parameter information for any number of corresponding nodes. Each data store may store the connection parameter information as one or more variables. For example, the one or more variables can include one or more of a RWND or a CWND associated with a corresponding node. As shown in FIG. 1A, node 104A maintains a data store 106A, node 104B maintains a data store 106B, node 104C maintains a data store 106C, node 104D maintains a data store 106D, node 104E maintains a data store 106E, and node 104F maintains a data store 106F. Each node 104A, 104B, 104C, 104D, 104E, and 104F is in local communication with a respective data store 106A, 106B, 106C, 106D, 106E, and 106F. In some embodiments, each node 104A, 104B, 104C, 104D, 104E, and 104F communicates with a respective data store 106A, 106B, 106C, 106D, 106E, and 106F through the network.

The example environment 100A including one or more of the nodes 104A, 104B, 104C, 104D, 104E, and 104F or the data stores 106A, 106B, 106C, 106D, 106E, and 106F can be implemented as a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to commands. These resources can be dynamically provisioned and reconfigured to adjust to variable load.

The nodes 104A, 104B, 104C, 104D, 104E, and 104F of the example environment 100A are in a peer-to-peer configuration. Each node 104A, 104B, 104C, 104D, 104E, and 104F communicates with each of the other nodes 104A, 104B, 104C, 104D, 104E, and 104F through the network. The network can include the Internet, an intranet network, a cellular communication network, a wide area network ("WAN"), a local area network ("LAN"), a personal area network ("PAN"), a wireless local area network ("WLAN"), or other networks. In some implementations, each node 104A, 104B, 104C, 104D, 104E, and 104F communicates with a subset of the nodes 104A, 104B, 104C, 104D, 104E, and 104F. For example, node 104A communicates with nodes 104B and 104C. In other implementations, each node 104A, 104B, 104C, 104D, 104E, and 104F communicates with a corresponding node 104A, 104B, 104C, 104D, 104E, or 104F.

Figure 2A:
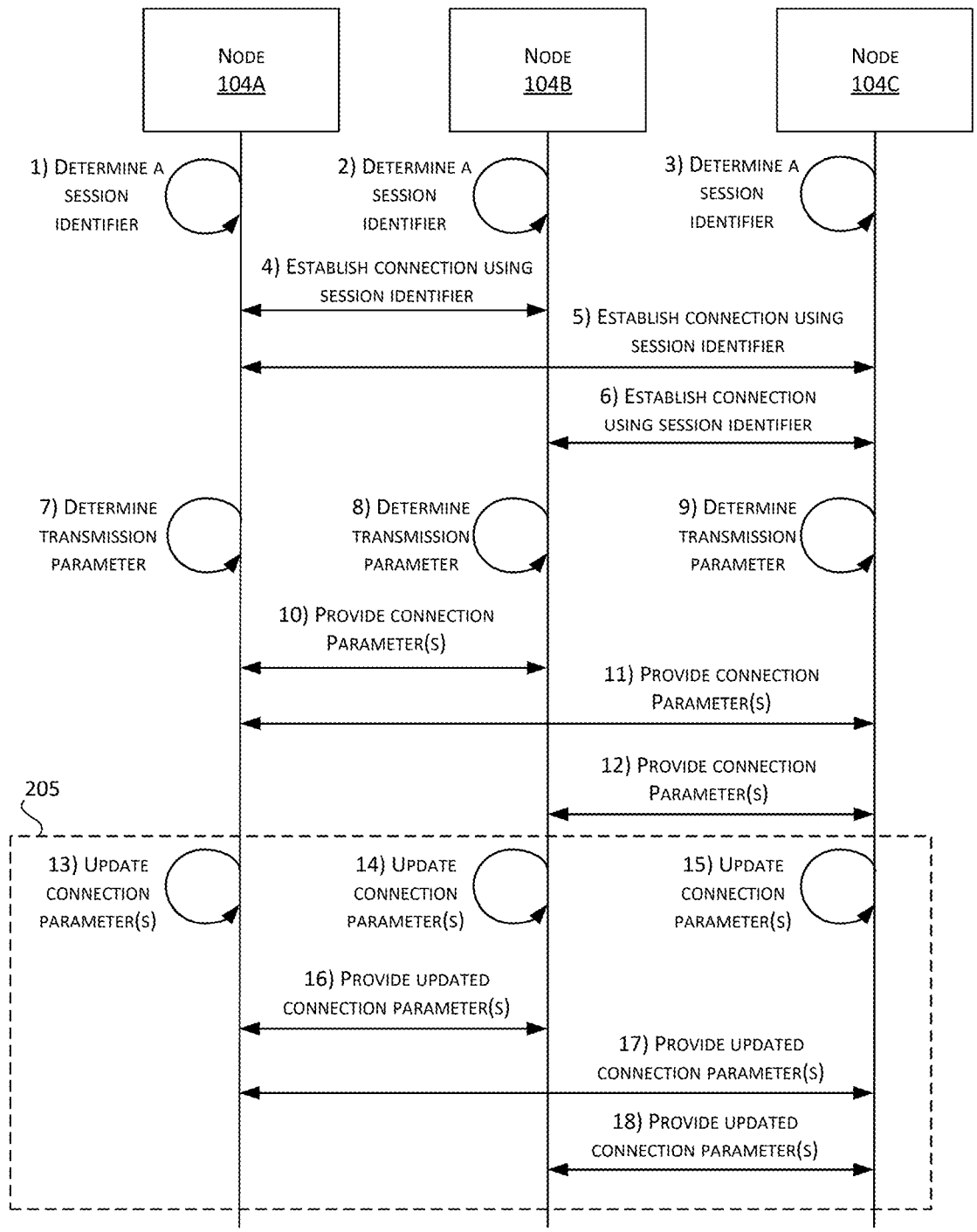
FIG. 2A depicts an example workflow for establishing a minimum transmission parameter in an example networked environment in a peer-to-peer configuration.

Each node 104A, 104B, 104C, 104D, 104E, and 104F may have initial connection parameter information stored in a corresponding data store 106A, 106B, 106C, 106D, 106E, and 106F. For example, when a given node is initialized and/or when a network connection is established to another node, the node is provided with corresponding initial connection parameter information. In some embodiments, the initial connection parameter information corresponds to computing device limitations, connection limitations, or other limitations associated with the computing device, the data store, or the network. Each node 104A, 104B, 104C, 104D, 104E, and 104F may update the connection parameter information based upon communications with another node 104A, 104B, 104C, 104D, 104E, or 104F. A node 104A, 104B, 104C, 104D, 104E, or 104F can perform one or more operations to determine an updated connection parameter based on received information. For example, the node 104A, 104B, 104C, 104D, 104E, or 104F can receive multiple transmission parameters and determine an updated transmission and/or reception parameter based on the multiple transmission parameters. The node 104A, 104B, 104C, 104D, 104E, or 104F can update the connection parameter information in the corresponding data store 106A, 106B, 106C, 106D, 106E, or 106F based on the updated connection parameter. The node 104A, 104B, 104C, 104D, 104E, or 104F subsequently uses the updated connection parameter information for communications through the network. Over the course of a session, the connection parameters of the nodes 104A, 104B, 104C, 104D, 104E, and 104F converge on a session connection parameter that is used by all session participants. An example of peer-to-peer nodes determining a session connection parameter and using the session connection parameter to manage network communications with other peer-to-peer nodes is shown in FIG. 2A and described in greater detail below.

Figure 1B:
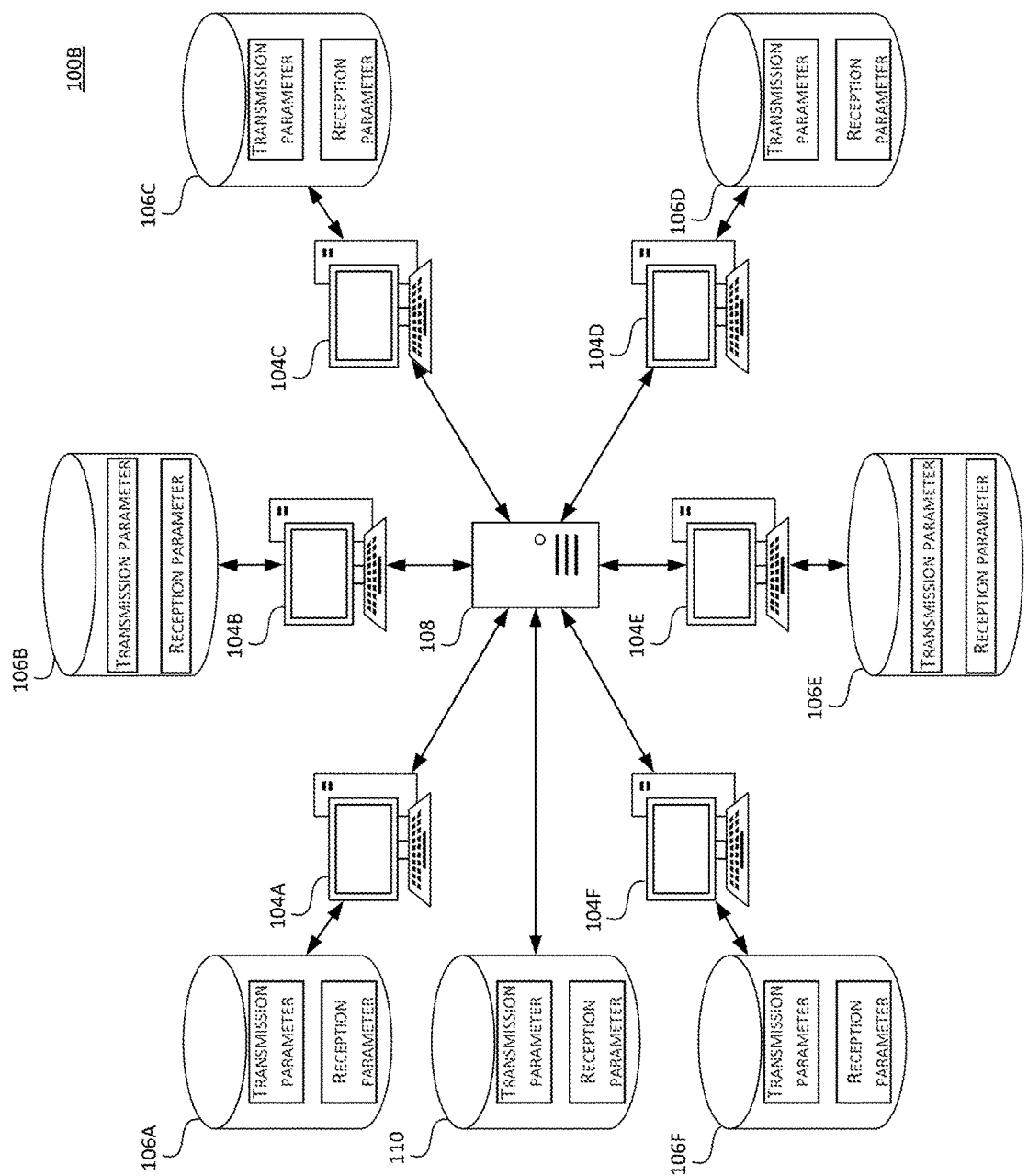
FIG. 1B depicts a schematic diagram of an example networked environment according to some embodiments.

FIG. 1B illustrates an example environment 100B in which a session-based network connection control mechanism may be implemented according to some embodiments, enabling multiple connections in the same session to be regulated according to uniform connection parameters. The example environment 100B contains nodes 104A, 104B, 104C, 104D, 104E, and 104F connected to and communicating to a server 108 over a network (not shown in FIG. 1B). In some embodiments, the example environment 100B contains more or less nodes and/or more or less servers. The server 108 may be a computing device that provides computing services and resources to end-user devices, such as the nodes 104A, 104B, 104C, 104D, 104E, and 104F. The server 108 may communicate with a data store 110. The data store 110 may store connection parameter information (e.g., information about a corresponding transmission parameter and/or reception parameter) for the server 108. In some embodiments, the transmission parameter and the reception parameter may be stored in separate data stores. The server 108 may store the connection parameter information as a set of variables in the data store 110. The server 108 may base communications with a node 104A, 104B, 104C, 104D, 104E, or 104F on the connection parameter information stored in the data store 110 and each of the nodes 104A, 104B, 104C, 104D, 104E, and 104F may base communications with a server 108 on corresponding connection parameter information stored in a corresponding data store 106A, 106B, 106C, 106D, 106E, and 106F.

Each node 104A, 104B, 104C, 104D, 104E, and 104F communicates with the server 108 through the network. In some implementations, a subset of the nodes 104A, 104B, 104C, 104D, 104E, and 104F communicates with the server 108. For example, node 104A communicates with node 104B and node 104B may communicate with server 108.

Figure 2B:
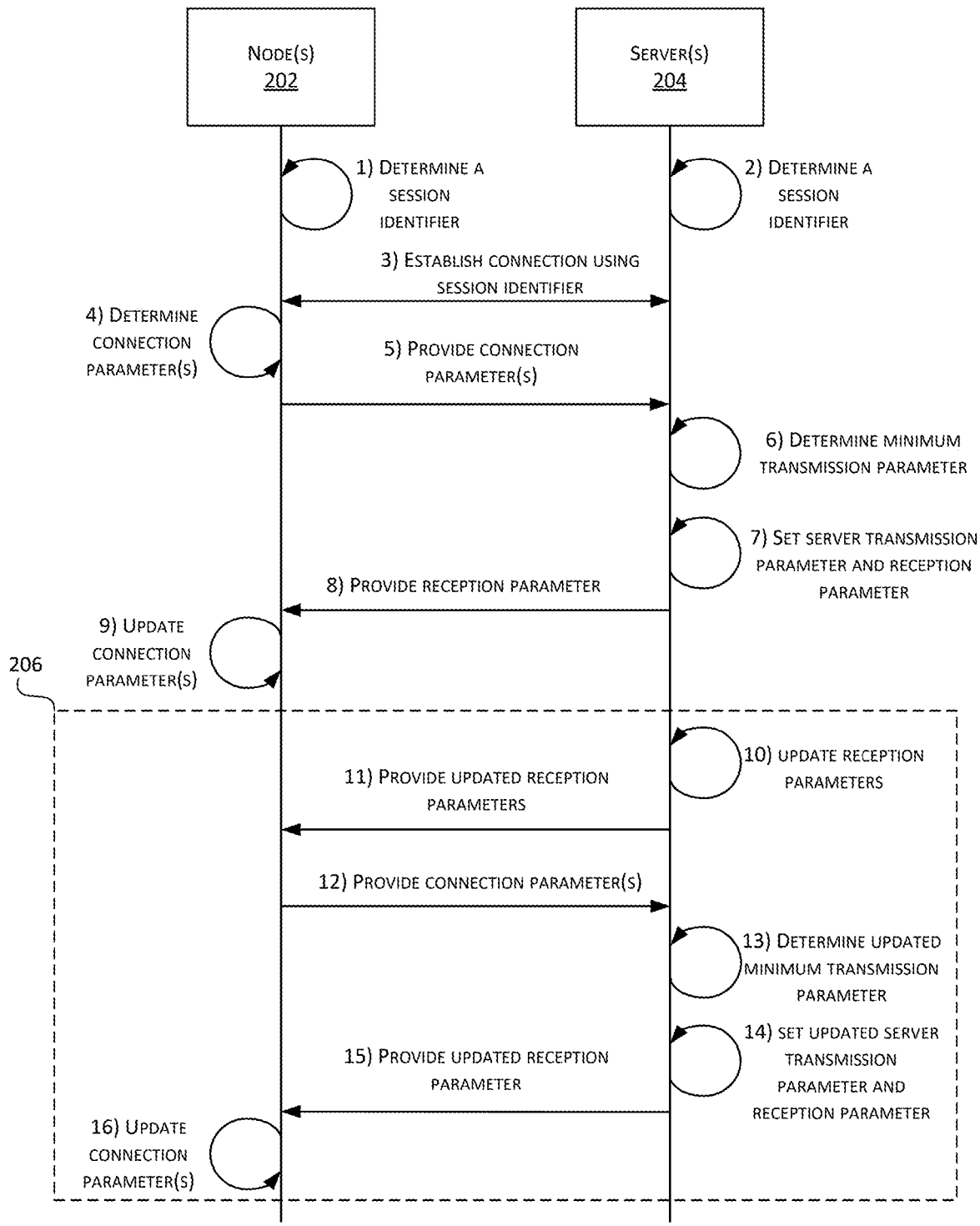
FIG. 2B depicts an example workflow for establishing a minimum transmission parameter in an example networked environment in a server-node configuration.

Each node 104A, 104B, 104C, 104D, 104E, and 104F and the server 108 may have initial connection parameter information stored in the corresponding data store 106A, 106B, 106C, 106D, 106E, 106F, and 110. For example, when a given node is initialized and/or when a network connection is established to the server, the given node is initialized with corresponding initial connection parameter information. The server 108 may have initial connection parameter information and may update the connection parameter information based upon communications with a node 104A, 104B, 104C, 104D, 104E, or 104F. The server 108 can perform one or more operations to determine an updated connection parameter based on information received from one or more of the nodes 104A, 104B, 104C, 104D, 104E, and 104F. In some embodiments, the server 108 can receive connection parameters from one or more of the nodes 104A, 104B, 104C, 104D, 104E, and 104F. The server 108 may determine updated connection parameters based on the connection parameters received from one or more of the nodes 104A, 104B, 104C, 104D, 104E, and 104F. For example, the nodes 104A, 104B, 104C, 104D, 104E, and 104F can each transmit a reception parameter to the server 108 and the server 108 can determine an updated reception parameter and an updated transmission parameter based on the reception parameters. The server 108 can transmit the updated reception parameter to the nodes 104A, 104B, 104C, 104D, 104E, and 104F and the nodes 104A, 104B, 104C, 104D, 104E, and 104F can use the server's updated reception parameter to manage transmissions to the server (e.g., the nodes may slow down transmissions to the server based on a lower RWND advertised by the server). The server 108 may communicate with each of the nodes 104A, 104B, 104C, 104D, 104E, and 104F based at least in part on the updated connection parameters of the server 108 and the updated connection parameters of the node 104A, 104B, 104C, 104D, 104E, or 104F. Over the course of a session, the connection parameters of the nodes 104A, 104B, 104C, 104D, 104E, and 104F and server 108 converge on a session connection parameter that is used by all session participants. An example of the server 108 determining a session connection parameter based on connection parameters received from nodes is shown in FIG. 2B and described in greater detail below.

In some embodiments, the system may include multiple servers where each server communicates with a different set of nodes. The multiple sets of nodes and the multiple servers may each correspond to the session. A first server may determine a session connection parameter based on a first set of nodes and communicate the session connection parameter to a second server. Additionally, the second server may determine a session connection parameter based on a second set of nodes and communicate the session connection parameter to the first server. The first server and the second server may subsequently update the session connection parameter based on the session connection parameter of the first server and the session connection parameter of the second server. Therefore, though each server communicates with a separate set of nodes, the servers may establish a session connection parameter that is consistent across multiple servers and multiple sets of nodes corresponding to the same session so that the entire session is consistent. A given server may select one or more servers to propagate a corresponding session connection parameter. In some embodiments, the servers to which a particular server forwards a session connection parameter may include all servers with which the particular server communicates, or the servers may be determined based on certain protocols, such as a gossip protocol.

Figure 1C:
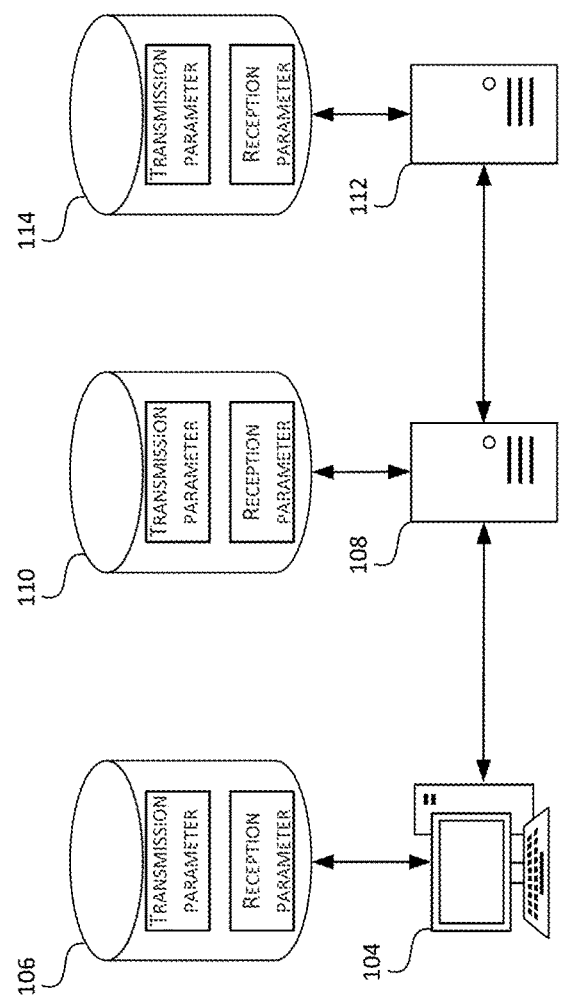
FIG. 1C depicts a schematic diagram of an example networked environment according to some embodiments.

FIG. 1C illustrates an example environment 100C in which a session-based network connection control mechanism may be implemented according to some embodiments, enabling multiple connections in the same session to be regulated according to uniform connection parameters. The example environment contains node 104 connected to and communicating with a proxy server 108 over a network (not shown in FIG. 1C). Further, the proxy server 108 is connected to and communicating with a server 112. In some embodiments, the proxy server 108 may be connected to additional nodes and/or servers. For example, the proxy server 108 can be connected to multiple servers and/or multiple nodes. The proxy server 108 and/or the server 112 may be a computing device that provides computing services and resources to end-user devices, such as the node 104. The proxy server 108 may act as a connection endpoint for communications between the node 104 and the server 112. Each of the node 104, the proxy server 108, and the server 112 may communicate with a respective data store 106, 110, and 114. The data stores 106, 110, and 114 may store connection parameter information (e.g., information about a corresponding transmission parameter and/or a reception parameter) for the node 104, the proxy server 108, and the server 112 respectively. The node 104, proxy server 108, and the server 112 may store corresponding connection parameter information as a set of variables in the corresponding data store 106, 110, 114. The node 104 may base communications with the proxy server 108 on the connection parameter information stored in the data store 106, the server 108 may base communications with the node 104 and the server 112 on the connection parameter information stored in the data store 110, and the server 112 may base communications with the proxy server 108 on the connection parameter information stored in the data store 114. The node 104 and the proxy server 108 and the server 112 and the proxy server 108 each communicate through the network. In some implementations, the node 104 and the server 112 may communicate through the network.

Each of the node 104, the proxy server 108, and the server 112 may have initial connection parameter information stored in the corresponding data store 106, 110, and 114. For example, when a node, server, or proxy server is initialized and/or when a network connection is established by a node, server, or proxy server, the given device is initialized with corresponding initial connection parameter information. In some embodiments, the initial connection parameter information corresponds to computing device limitations, connection limitations, or other limitations associated with the computing device, the data store, or the network. The proxy server 108 may update associated connection parameter information based upon communications with the node 104 and the server 112. The proxy server 108 can perform one or more operations to determine an updated connection parameter based on information received from one or more of the node 104 and/or the server 112. For example, the proxy server 108 can receive connection parameters from one or more of the node 104 and/or the server 112. The proxy server 108 may determine updated connection parameters based on the connection parameters received from one or more of the node 104 and the server 112. For example, the node 104 and the server 112 can each transmit a reception parameter to the proxy server 108 and the proxy server 108 can determine an updated reception parameter and an updated transmission parameter based on the reception parameters. The proxy server 108 can transmit the updated reception parameter to the node 104 and the server 112. The node 104 and the server 112 can use the proxy server's updated reception parameter to manage transmissions from each of the node 104 and the server 112, respectively, to the proxy server 108. The proxy server 108 may communicate with the node 104 based at least in part on the updated connection parameters of the proxy server 108 and the connection parameters of the node 104. The proxy server 108 may communicate with the server 112 based at least in part on the updated connection parameters of the proxy server 108 and the connection parameters of the server 112. Over the course of a session, the connection parameters of the nodes 104, proxy server 108, and server 112 converge on a session connection parameter that is used by all session participants. An example of the server 108 determining a session connection parameter based on connection parameters received from other devices (such as nodes and/or servers) is shown in FIG. 2B and described in greater detail below.

FIG. 2A depicts interactions among various components shown in FIG. 1A for implementing a session-based network connection control mechanism in accordance with aspects of the present disclosure. The networked environment 200A may include various components implemented in a peer-to-peer configuration as identified in FIG. 1A. The networked environment 200A may include a plurality of nodes that are configured to communicate with each other through a network. Additionally, while the networked environment 200A includes nodes 104A, 104B, and 104C, the networked environment 200A may include more or less nodes. The nodes 104A, 104B, and 104C may correspond to one or more computing devices, hosts, accounts, clients, etc. Each of the nodes 104A, 104B, and 104C may further correspond to separately instantiated environments.

As shown in FIG. 2A at (1), node 104A determines a session identifier. The node 104A may receive information (e.g., a command or a request) corresponding to communications with nodes 104B and 104C. For example, the node 104A may receive a command or request to implement a session with nodes 104B and 104C, such as a video conference, a multiplayer game, or a collaborative meeting in which nodes 104A, 104B, and 104C are to each participate. In connection with the command or request, the node 104A may receive a session identifier for the session with nodes 104B and 104C. In some implementations, based on the received command, request, or other information, the node 104A may select a session identifier for the network communication session with the nodes 104B and 104C. In other implementations, the session identifier is selected based on one or more logical operations. Each of the nodes 104A, 104B, and 104C may perform the same logical operations to determine the session identifier. In other implementations, the node 104A may select the session identifier based on a hashing process. For example, the node 104A may use the information associated with the particular communications (e.g., the nodes associated with the particular communications) to select a session identifier. In some implementations, the session identifier can represent, be derived from, or otherwise correspond to the nodes comprising the session (e.g., nodes 104A, 104B, and 104C).

At (2) and (3) nodes 104B and 104C determine a session identifier. Nodes 104B and/or 104C may determine the session identifier in the same or similar fashion as node 104A determining the session identifier in (1). Each node 104A, 104B, and 104C may simultaneously determine the session identifier, such as based on data generated by or received from a system or application that is facilitating the network communication session. In other embodiments, a subset of the nodes 104A, 104B, and 104C may determine a session identifier and transmit the session identifier to other nodes.

At (4), the node 104A establishes a connection with the node 104B using the session identifier. The node 104A may transmit the session identifier to the node 104B and the node 104B may transmit the session identifier to the node 104A. In some implementations, only one of the node 104A or 104B transmits a session identifier. The node 104A may transmit the session identifier to the node 104B and the node 104B may confirm the session by transmitting the session identifier back to the node 104A. By transmitting the session identifier to the node 104A, the node 104B may confirm that the session is established. The node 104A and 104B may transmit the session identifier as a portion of a cookie, a packet, or a different piece of network traffic.

In one specific, non-limiting embodiment, node 104A and node 104B exchange the session identifier during an initial transmission control protocol (TCP) handshake performed to establish a connection. For example, node 104A may initiate the handshake by sending a synchronize ("SYN") communication to node 104B. Node 104A may include the session identifier in the header of the SYN, such as in the "options" field. Node 104B may acknowledge the SYN by responding with a synchronize-acknowledgment ("SYN-ACK") communication that includes the session identifier in the header, such as in the "options" filed. In this way, both nodes 104A and 104B demonstrate that the connection is to be managed collectively with one or more other connections associated with the session identifier. In some embodiments, the first time the session identifier is included in a communication during the handshake may be in the SYN-ACK communication from node 104B to node 104A. Node 104A may include the session identifier in the acknowledgment ("ACK") response, such as in the "options" field of the header. In some embodiments, only one of the node 104A and 104B include the session identifier in a communication to the other node 104A or 104B.

Subsequent communications between the node 104A and the node 104B may contain the session identifier in order to identify the subsequent communications as being part of the same session. Similar operations may occur at (5) and (6) where node 104A establishes a connection with the node 104C using the session identifier and the node 104B establishes a connection with the node 104C using the session identifier. Subsequent communications between the node 104A and node 104C, and between node 104B and 104C, may also include the session identifier. In addition, nodes 104A, 104B, and 104C may provide certain connection parameters, such as reception parameters, to the other nodes with which they communicate.

At (7), the node 104A determines a transmission parameter, such as a CWND. The node 104A may determine a transmission parameter based on one or more features associated with the node 104A. In some embodiments, the node 104A is provided with a transmission parameter for use in communication with other nodes. In other embodiments, the node 104A uses an initial transmission parameter and periodically increases the initial transmission parameter. Further, the transmission parameter may be based at least in part on node limitations, network limitations, or other limitations. The node 104A may further determine a reception parameter, such as an RWND, based at least in part on node limitations, network limitations, or other limitations. For example, an initial RWND that the node 104A advertises to one or more other nodes may be based on the hardware and/or software characteristics of the node 104A. Node 104A may determine the same initial transmission parameter and reception parameter for each connection that the node 104A has established, or there may be different initial connection parameters for each connection or subset of connections. Similar operations may occur at (8) and (9) where node 104B determines a transmission parameter and a reception parameter, and node 104C determines a transmission parameter and a reception parameter.

At (10), the node 104A exchanges connection parameters with the node 104B. The node 104A may transmit its reception parameter to the node 104B and the node 104B may transmit its reception parameter to the node 104A. This exchange of connection parameters may occur during the normal course of communications between the nodes 104A and 104B. For example, the nodes 104A and 104B may advertise their RWNDs to the nodes and the other endpoints of their respective connections. In addition, node 104A may exchange transmission parameters with node 104B. The transmission parameters (e.g., CWNDs) may be provided so that the nodes have additional data about the state of the network connections that are part of the current session. The additional data can be used to adjust connection parameter (s) for individual nodes and collectively converge on session connection parameter(s) for all nodes in the session, as described in greater detail below.

In some implementations, only one of the node 104A or 104B transmits a respective transmission parameter to the other node. In other implementations, the node 104A transmits a corresponding transmission parameter to the node 104B at a first time and the node 104B transmits a corresponding transmission parameter to the node 104A at a second time. The node 104A and 104B may transmit the corresponding transmission parameter as a portion of a cookie, a packet, or a different piece of network traffic.

In some embodiments, each node in the session (or some subset thereof) may propagate their respective transmission parameters to one or more other nodes in the session. The selection and propagation of transmission parameters may be managed according to a predetermined or dynamically determined protocol, such as a gossip protocol. For example, a node may select x other nodes (e.g., x=2) to which the node sends its current transmission parameter. Illustratively, the transmission parameter may be sent using a signaling packet (e.g., a packet with a structure <nodeID, CWND, session ID>), as an element in a header of a packet (e.g., a TCP segment options field), or the like.

Similar operations may occur at (11) and (12) where node 104A exchanges one or more connection parameter(s) with the node 104C (e.g., the nodes exchange RWNDs and, optionally, CWNDs depending upon the transmission parameter signaling protocol being used), and the node 104B exchanges one or more connection parameter(s) with the node 104C (e.g., the nodes exchange RWNDs and, optionally, CWNDs depending upon the transmission parameter signaling protocol being used).

Figure 4:
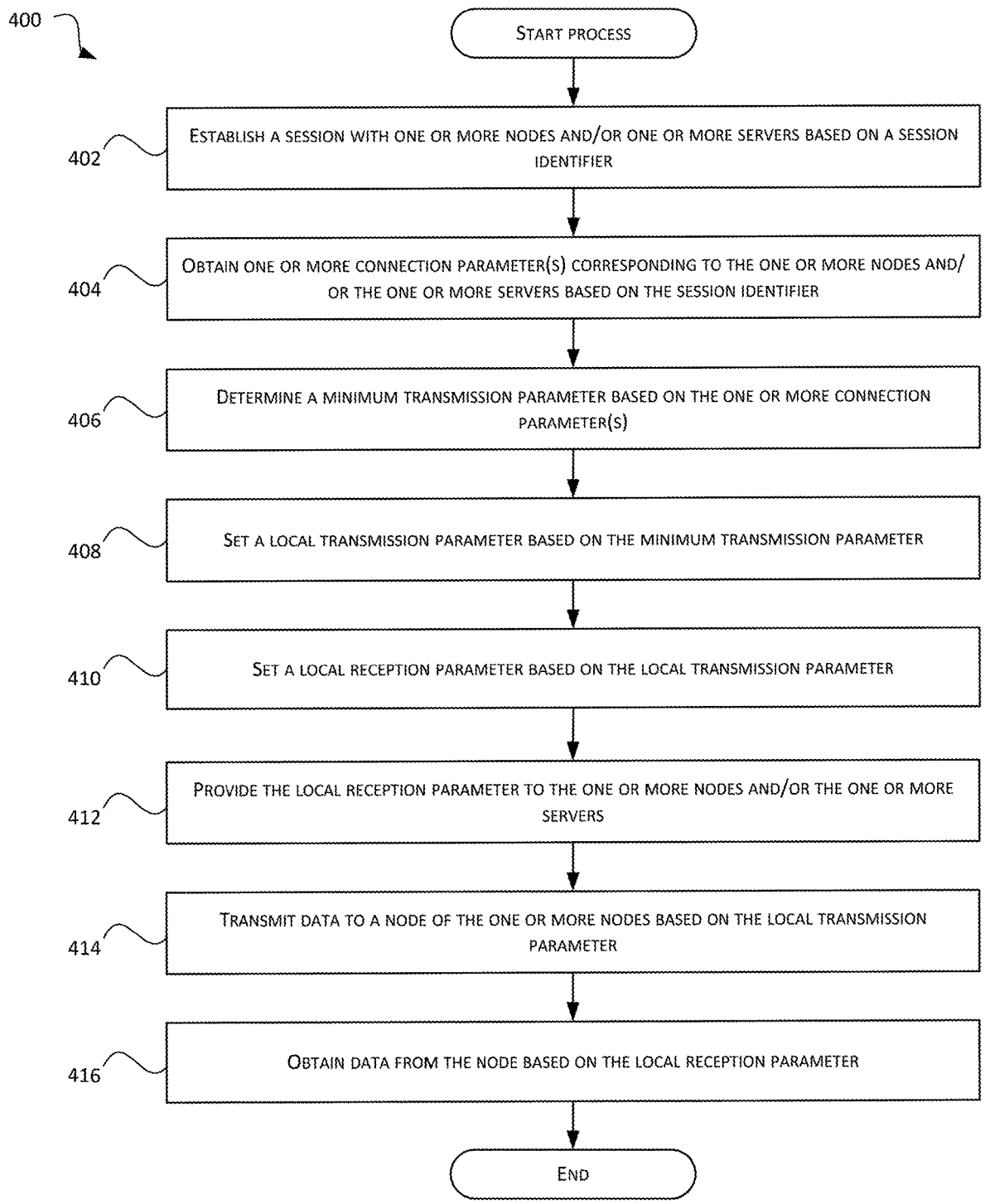
FIG. 4 is a flowchart of an example routine for receiving connection parameters from multiple nodes and establishing a minimum transmission parameter.

At (13), the node 104A updates one or more of its connection parameters based on the received transmission parameters. The node 104A may analyze the received transmission parameters with a transmission parameter associated with the node 104A. In analyzing the transmission parameters, the node 104A may determine one or more characteristics of the transmission parameters. In some embodiments, the node 104A may determine a minimum transmission parameter of the analyzed transmission parameters. The node 104A may then set its own transmission parameter to the determined minimum transmission parameter. In some embodiments, the node 104A may also update its reception parameter based on the determined minimum transmission parameter. In some implementations, the node 104A may determine alternative or additional characteristics such as a mean, median, or maximum of the transmission parameters. An example routine for analyzing connection parameters of other nodes/server and updating one or more connection parameters of the node/server performing the analysis is shown in FIG. 4 and described in greater detail below. Similar operations may occur at (14) and (15) where node 104B and node 104C determine a respective minimum transmission parameter or otherwise update one or more of their respective connection parameters.

At (16), the node 104A exchanges one or more updated connection parameters with the node 104B. The node 104A may transmit an updated transmission parameter to the node 104B (e.g., as determined above) and the node 104B may transmit an updated transmission parameter to the node 104A. In some implementations, only one of the node 104A or 104B transmits an updated transmission parameter. For example, the node 104A can determine an updated transmission parameter based on received transmission parameters and provide the updated transmission parameter. In other implementations, the node 104A transmits an updated corresponding transmission parameter to the node 104B at a first time and the node 104B transmits a corresponding transmission parameter to the node 104A at a second time. The node 104A and 104B may use the updated transmission parameter for communications between the nodes. For example, the node 104A may base transmissions to the node 104B on the corresponding updated transmission parameter and the node 104B may base transmissions to the node 104A on the corresponding updated transmission parameter. Further, the node 104A and the node 104B may use a corresponding updated transmission parameter in communications with any other node. The node 104A may base transmissions on the corresponding updated transmission parameter by restricting any transmissions from the node 104A such that the updated transmission parameter is not exceeded by the node 104A. The node 104A may also or alternatively provide an updated reception parameter to the node 104B (e.g., as determined above). For example, the updated reception parameter may be provided to node 104B by signaling an RWND in the TCP header of communications to the node 104B.

The operations at (16) may also occur at (17) and (18) where node 104A exchanges one or more updated connection parameters with the node 104C and the node 104B exchanges one or more updated connection parameters with the node 104C. Further, the updated connection parameters may be exchanged in the same or similar fashion to the exchange of transmission parameters in (10), (11), and (12).

The interactions labeled (13)-(18) may occur multiple times, and are therefore shown in FIG. 2A as loop 205. In some embodiments, loop 205 is performed periodically (e.g., every n seconds) while the session is maintained. In some embodiments, the loop 205 or portions thereof may be performed dynamically, such as in response to network events and/or events occurring at one or more of the nodes 104A, 104B, 104C. For example, the interactions (13)-(18) may occur in a different order than shown, in a different order from loop to loop, at different intervals, sequentially or asynchronously, etc.

FIG. 2B depicts interactions among various components shown in FIG. 1B and FIG. 1C for implementing a session-based network connection control mechanism in accordance with aspects of the present disclosure. The networked environment 200B may include various components implemented in a server-node configuration as identified in FIG. 1B or a proxy server-node configuration as identified in FIG. 1C. The networked environment 200B may include a plurality of nodes 202 that are configured to communicate with one or more servers 204 through a network. The plurality of nodes 202 may correspond to one or more computing devices, hosts, accounts, clients, servers, etc. In some embodiments, the one or more servers 204 may include a proxy server. Each of the plurality of nodes 202 may communicate with the same server 204, such that a single server 204 serves as a hub for all communications. In some embodiments, there may be multiple servers 204, and subsets of the plurality of nodes 202 may communicate with different servers 204. In such cases, the servers 204 may communicate with each other such that all nodes 202 are in indirect communication with all other nodes 202.

As shown in FIG. 2B at (1) and (2), each node 202 and each server 204 determines a session identifier. One or more of the nodes 202 or the servers 204 can receive a command to implement a session with the each node 202 and each server 204, such as a video conference, a multiplayer game, or a collaborative meeting in which nodes 202 are to each participate via server(s) 204. Further, the command may include a session identifier that identifies the session between the nodes 202 and the servers 204. In some implementations, one or more of the nodes 202 or the servers 204 determines a session identifier based on receiving the command to implement the session and transmits the session identifier to the nodes 202 and the servers 204. By basing the session on a session identifier, the node 202 or the server 204 implementing the session can ensure that each node 202 and server 204 that is associated with the session is aware of the session identifier. The session identifier can be used by the nodes 202 and the servers 204 to verify that a communication from and/or to a particular node or server is associated with the session. For example, a node 202 can receive communications from a particular node or server and verify that the communications correspond to the session by verifying that the communications include the session identifier. In some implementations, a node may store data or be associated with data detailing the nodes 202 and servers 204 that are part of the session.

At (3), the nodes 202 and the servers 204 establish a connection using the session identifier. One or more of the nodes 202 or the servers 204 can transmit the session identifier to additional nodes 202 and the servers 204. By transmitting the session identifier to the additional nodes 202 and the servers 204, the particular node 202 or server 204 can indicate that the session includes the connection between the nodes 202 and the servers 204.

At (4), the nodes 202 determine one or more connection parameters. After determining corresponding one or more connection parameters, the nodes 202 can store the connection parameters in an associated data store (e.g., local memory, remote memory, a cache). In some implementations, the nodes 202 can determine the connection parameters by reading the connection parameters from the associated data store.

At (5), the nodes 202 provide the one or more connection parameters to the servers 204. Each of the nodes 202 may provide corresponding one or more connection parameters to the servers 204. In some embodiments, the nodes 202 may provide one or more of a transmission parameter and a reception parameter to the servers 204. For example, each node 202 may include an RWND in communications sent to the server 204 to which it is connected.

At (6), the servers 204 determine a minimum transmission parameter by comparing the connection parameters received from the respective nodes 202 to which they are connected. The servers 204 may compare each of the received connection parameters in order to determine a minimum connection parameter of the nodes 202 and establish the minimum connection parameter as the minimum transmission parameter. In some implementations, the servers 204 may determine a respective minimum transmission parameter for a first subset of nodes 202 and a respective minimum transmission parameter for a second subset of nodes 202.

At (7), each of the servers 204 set a server transmission parameter and a server reception parameter based on the minimum transmission parameter. Each server 204 may set the server transmission parameter to correspond to the minimum transmission parameter. For example, a server 204 may set its CWND to be the minimum of all RWNDs received from the nodes with which the server 204 communicates. In some implementations, the servers 204 may derive the server transmission parameter from the minimum transmission parameter based on one or more functions. Further, each server 204 may determine a server reception parameter based on a function including the minimum transmission parameter or the server transmission parameter. For example, a server may set its RWND based on the determined CWND. The servers 204 may store the server transmission parameter and the server reception parameter in a data store associated with the servers 204.

At (8), the servers 204 provide the server reception parameter to the nodes 202. For example, a server 204 may include its updated RWND, which is based on the updated CWND, in communications sent to the nodes 202 with which the server 204 is connected. In some implementations, the servers 204 may provide the server transmission parameter to the nodes 202.

At (9), the nodes 202 update local connection parameters based on the received server reception parameter. The nodes 202 update a local reception parameter based on the server reception parameter. For example, the nodes 202 may set the local reception parameter equal to the server reception parameter. Further, the nodes 202 may update the local transmission parameter based on one or more of the server reception parameter or the local reception parameter. In some embodiments, a node 202 may not update local connection parameters based on the received server reception parameter. Rather, the node 202 may use the received server reception parameter to determine how much unacknowledged data to send to the server 204. The node's own connection parameters may be determined, maintained, used, and/or signaled separately from any parameter received from the server 204.

The remaining interactions of FIG. 2B may occur multiple times, and are therefore shown in FIG. 2B as loop 206. In some embodiments, loop 206 is performed periodically (e.g., every n seconds) while the session is maintained. In some embodiments, the loop 206 or portions thereof may be performed dynamically, such as in response to network events and/or events occurring at one or more of the nodes 202 and/or servers 204. For example, the interactions in loop 206 may occur in a different order than shown, in a different order from loop to loop, at different intervals, sequentially or asynchronously, etc.

Illustratively, at (10), the servers 204 update the server reception parameter. In other embodiments, the servers 204 update the server transmission parameter. The servers 204 may update the server reception parameters incrementally or based on reception parameters received from the nodes 202. For example, the servers 204 may increase their respective server reception parameters to allow the servers 204 to receive more data (e.g., determined from an increase to a server transmission parameter that has been updated based on one or more increased node reception parameters). As another example, the servers 204 may decrease their respective server reception parameters to reduce the amount of data sent by the nodes 202 (e.g., determined from a decrease to a server transmission parameter that has been updated based on one or more decreased node reception parameters). Further, updating the server transmission parameter may be based at least in part on a TCP congestion control algorithm. For example, the TCP congestion control algorithm may be a slow start algorithm, a congestion avoidance algorithm, a fast retransmit/fast recovery algorithm, an additive increase/multiplicative decrease algorithm, a TCP proportional rate reduction algorithm, etc. The server transmission parameter may be updated based on a TCP congestion control algorithm, at different intervals, such as every time a packet is received. The intervals at which the server transmission parameter is updated may be based on the TCP congestion control algorithm being implemented. Further, the amount that the server transmission parameter is updated by may be based on the TCP congestion control algorithm being implemented. For example, under a slow start algorithm, the server transmission parameter may be doubled every round-trip time and, under a congestion avoidance algorithm, the server transmission parameter may be additively increased by a small segment every round-trip time. At (11), the updated server reception parameter is provided to the nodes 202 by the servers 204. The servers 204 may provide the updated server reception parameter via the connection between the nodes 202 and the servers 204. In some implementations, the nodes 202 may update one or more of a local transmission parameter or a local reception parameter based on the server reception parameter.

At (12), the nodes 202 provide connection parameters to the servers 204. The nodes 202 provide the connection parameters to the servers 204 via the connection between the nodes 202 and the servers. The connection parameters may be the same connection parameters provided in (5). In some implementations, the connection parameters may be updated connection parameters. For example, the nodes 202 may update the connection parameters based on the connections and provide the updated connection parameters to the servers 204. In some implementations, the nodes 202 determine connection congestion events (e.g., that a loss of data has occurred, a node buffer is full, etc.) and provide these events to the servers 204.

At (13), the servers 204 determine an updated minimum transmission parameter. The servers 204 may compare the connection parameters provided by the nodes 202 in order to determine an updated minimum transmission parameter. At (14), based on the updated minimum transmission parameter, the servers 204 sets an updated server transmission parameter and an updated server reception parameter. The servers 204 determine the updated server transmission parameter based on the updated minimum transmission parameter and the updated server reception parameter based on the updated server transmission parameter or the updated minimum transmission parameter. An example routine for analyzing connection parameters of nodes and updating one or more connection parameters of the server performing the analysis is shown in FIG. 4 and described in greater detail below.

At (15), the servers 204 provide the updated server reception parameter to the nodes 202. The servers 204 may provide the updated server reception parameter via the connections between the nodes 202 and the servers 204. At (16), the nodes 202 update connection parameters based on the updated server reception parameter. The nodes 202 may determine an updated local reception parameter based on the updated server reception parameter and an updated local transmission parameter based on the updated server reception parameter or the updated local reception parameter. In some embodiments, a node 202 may not update local connection parameters based on the updated server reception parameter. Rather, the node 202 may use the updated server reception parameter to update how much unacknowledged data the node 202 can send to the server 204.

Figure 3:
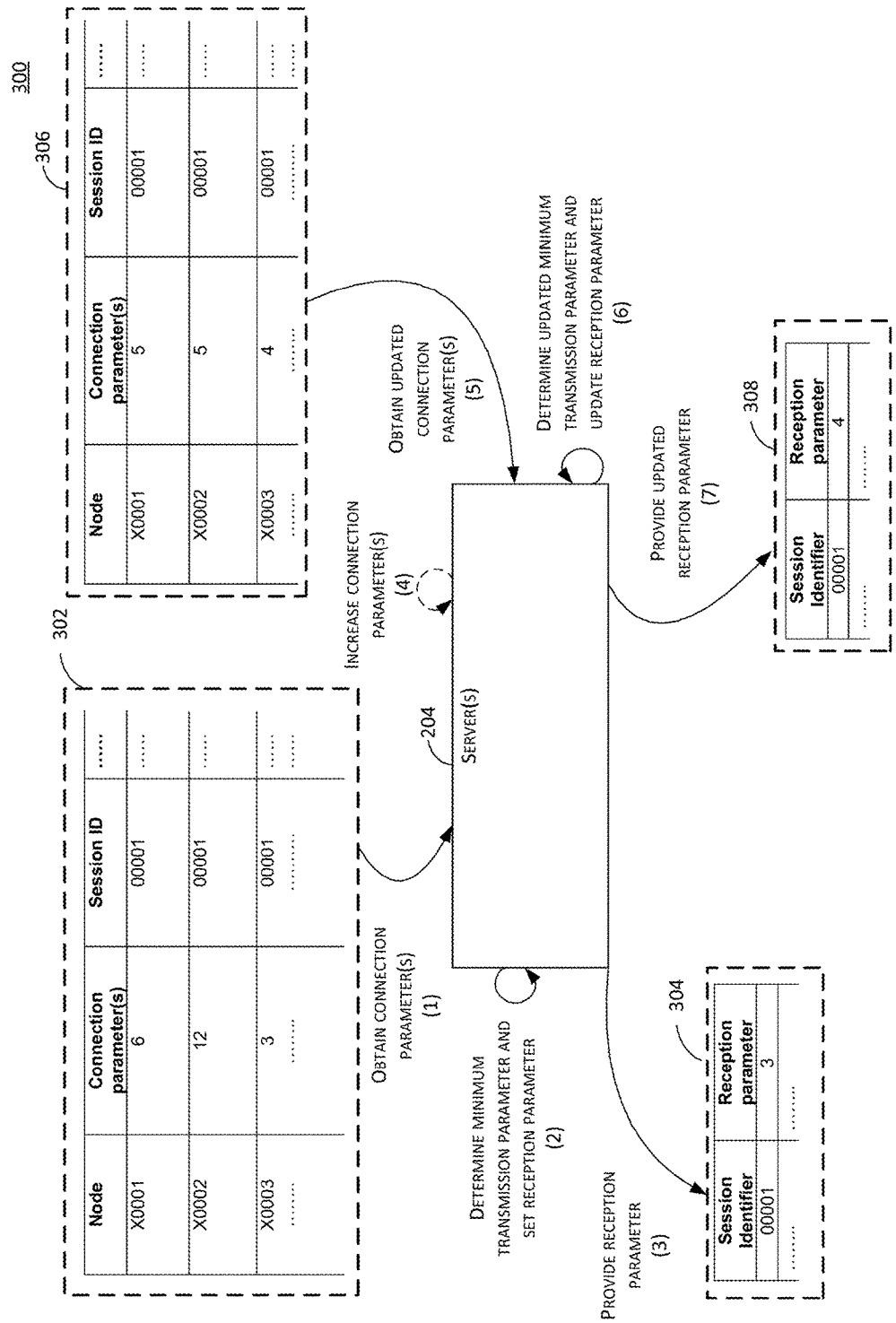
FIG. 3 depicts a schematic diagram of a server in an example networked environment according to some embodiments.

FIG. 3 depicts an example workflow 300 for a server 204 establishing connection parameters for nodes in accordance with aspects of the present disclosure. The server 204 may periodically establish connection parameters or may be initiated to establish connection parameters based on one or more congestion events (e.g., a loss of data at a node or a server). In some embodiments, a plurality of servers 204 establish connection parameters for nodes.

As shown in FIG. 3 at (1), the server 204 obtains connection parameters corresponding to particular nodes. The server 204 may obtain connection parameter information 302 from each node. In some embodiments, the server 204 receives connection parameter information 302 from one or more nodes and/or one or more servers. In the example of FIG. 3, the connection parameter information 302 includes nodes "X0001", "X0002", and "X0003" and each node is associated with a particular connection parameter "6", "12", and "3" and a session identifier "00001". In some implementations, the connection parameter information 302 can include more or less information and may correspond to more or less nodes. In other implementations, the server 204 may receive connection parameters associated with different session identifiers. For example, different nodes may be associated with different sessions and corresponding session identifiers. In some implementations, the connection parameter may correspond to a measure of unacknowledged data (e.g., bytes of data, packets of data) that a particular node can receive or transmit.

At (2), the server 204 determines a minimum transmission parameter based on the connection parameter information 302 and sets a server reception parameter. In the example of FIG. 3, the server 204 compares the connection parameters "6," "12," and "3" from the connection parameter information 302 to determine a minimum transmission parameter of "3." Further, the server reception parameter is set based on the minimum transmission parameter. In some embodiments, the server reception parameter is set as a function of the minimum transmission parameter, such as a multiple of the minimum transmission parameter (e.g., 1.5×, 2×, 2.5×, etc.) or a sum determined using the minimum transmission parameter (e.g., +1, +2, etc.). At (3), the server 204 provides server reception parameter information 304 that includes the server reception parameter to the nodes. The server 204 may transmit the server reception parameter information 304 via connections with the nodes. In the example of FIG. 3, the server reception parameter information 304 includes a session identifier "0001" and a reception parameter "3." In some implementations, the server reception parameter information 304 may not include the session identifier. Further, the server reception parameter information 304 may include more or less information.

At (4), the server 204 increases one or more server connection parameters for a particular session. The server 204 may periodically update (e.g., increment, increase, determine) the server transmission parameter. Further, the server 204 may additionally update the server reception parameter (e.g., as a function of the updated server transmission parameter). The server 204 may utilize the updated server transmission parameter and the updated server reception parameter for a particular session. In the example of FIG. 3, the server 204 updates the server transmission parameter from "3" to "5" and transmits an updated server reception parameter to the nodes based on the updated server transmission parameter. By increasing the one or more server connection parameters, the server 204 may increase the amount of unacknowledged data that can be sent to a particular node. The server 204 may increase the one or more server connection parameters until congestion is detected or a threshold is exceeded.

At (5), the server 204 obtains updated connection parameters from the nodes. The server 204 may obtain the updated connection parameters as a part of updated connection parameter information 306. In some embodiments, the server 204 may receive the updated connection parameters in response to a node determining that congestion has occurred or that a threshold (such as a node receiver window) was exceeded. In the example of FIG. 3, the updated connection parameter information 306 includes nodes "X0001", "X0002", and "X0003" and each node is associated with a particular reception parameter "5", "5", and "4" and a session identifier "00001." In some implementations, the updated connection parameter information 306 may include more or less information (e.g., the updated connection parameter information 306 may include updated transmission parameters and updated reception parameters) and may correspond to more or less nodes.

At (6), the server 204 determines an updated minimum transmission parameter based on the updated connection parameters received from the nodes. Further, the server 204 determines an updated server reception parameter and/or an updated server transmission parameter based on the updated minimum transmission parameter. In the example of FIG. 3, the server 204 compares the updated connection parameters "5," "5," and "4" from the updated connection parameter information 306 to determine an updated minimum transmission parameter of "4." Further, the updated server reception parameter is set (e.g., to "4") based on the updated minimum transmission parameter. At (7), the server 204 provides the updated server reception parameter to the nodes. The server 204 may provide the updated reception parameter information 308 that includes the updated server reception parameter to the nodes. In the example of FIG. 3, the updated reception parameter information 308 includes a session identifier "00001" and an updated server reception parameter "4."

FIG. 4 describes an illustrative process 400 for implementing a uniform connection parameter for a group of nodes and/or servers. The process 400 includes identifying connections between nodes and/or servers configured in a configuration such as a peer-to-peer architecture, a server-node architecture, or a proxy server-node architecture and linked based on a session identifier. By using such a session identifier, connection parameters may be shared between multiple connections such that different connections share a same or similar experience.

The process 400 begins at block 402. The process 400 may begin automatically upon receiving a request to initiate a session between multiple nodes. For example, a node may submit a request to a server or another node for a session involving multiple other nodes or servers. The process 400 may be embodied in a set of executable program instructions stored on a computer-readable medium, such as one or more disk drives, of a computing system of a node or a server. When the process 400 is initiated, the executable program instructions can be loaded into memory, such as random access memory ("RAM"), and executed by one or more processors of a computing system. Upon initiation of the process, at block 402, a computing device executing the process 400 (e.g., a node in a peer-to-peer architecture, a server in a client-server architecture, or a proxy server in a proxy server architecture) may establish or join a session with one or more nodes and/or one or more servers. For example, the computing device may establish the session by selecting a session identifier and transmitting the session identifier to the one or more nodes and/or one or more servers. In some embodiments, the computing device may transmit the session identifier as a part of a packet. For example, a packet may include a payload and a header and the computing device may include the session identifier in the packet payload and/or the packet header. In some implementations, the session identifier may be transmitted to a subset of the nodes and the subset of nodes may transmit the session identifier to a second subset of nodes via a certain protocol (e.g., a gossip protocol).

At block 404, the computing device may obtain one or more connection parameters corresponding to the one or more nodes and/or one or more servers that are associated with the session identifier. The computing device may receive one or more connection parameters from each node and/or server. The computing device may further determine that the one or more connection parameters are associated with the session based on the inclusion of the session identifier. The computing device may store for comparison connection parameters that are associated with the same session identifier. In some embodiments, the one or more connection parameters may be provided over a period of time and the computing device may periodically add the one or more connection parameters to previously stored connection parameters that are associated with the same session identifier.

At block 406, the computing device may compare the obtained one or more connection parameters in order to determine a minimum transmission parameter. The computing device may periodically update the minimum transmission parameter based on subsequently received connection parameters. In some implementations, the computing device may further update the minimum transmission parameter based on receiving a connection parameter. In some implementations, where one node or one server has an extremely poor connection (e.g., low connection parameters), the computing device may ignore the connection parameters associated with the particular node or particular server and determine the minimum transmission parameter based on the other nodes and/or servers associated with the session.

At block 408, the computing device may set a local transmission parameter as a session connection parameter to be used for all connections associated with the computing device, based on the minimum transmission parameter. The computing device may set a transmission parameter for the computing device as equal to the minimum transmission parameter. For example, the computing device may store the minimum transmission parameter in a local data store. In some implementations, the local transmission parameter may be determined based on applying one or more operations to the minimum transmission parameter. The local transmission parameter may subsequently be used by the computing device to indicate the amount of data that the computing device may transmit to a node and/or a server without receiving an acknowledgement. Use of a local transmission parameter for all connections of the computing device in lieu of separate transmission parameters of each of the connections of the computing device may result in transmissions over some connections being limited to a degree that they would not otherwise be limited in the absence of the process 400. Although this may reduce the quality or otherwise affect the experience observed over one or more connections, all of the connections will advantageously realize the same or a substantially similar experience.

At block 410, the computing device may set a local reception parameter based on the local transmission parameter as another session connection parameter to be used for all connections associated with the computing device. In some implementations, the computing device may set the local reception parameter based on the minimum reception parameter. The computing device may set a reception parameter for the computing device as equal to the local transmission parameter. In some implementations, the local reception parameter may be determined based on applying one or more operations to the local transmission parameter (e.g., applying multiplication factors, computing sums, etc.). The local reception parameter may subsequently be used by the computing device to indicate the amount of data that the computing device may receive from a node and/or a server.

At block 412, the computing device may provide the local reception parameter to the one or more nodes and/or the one or more servers. The computing device may provide the local reception parameter to each node and/or server associated with a connection that is included in the particular session. In some embodiments, the computing device may provide the local transmission parameter to each node and/or server associated with the particular session. In some embodiments, when a particular node and/or server receives the local reception parameter, the node and/or server may update a transmission and/or reception parameter associated with the particular device. For example, a node may execute an instance of process 400, whereby the node receives the local reception parameter from the computing device and may update a node reception parameter for the node. The node may store the node reception parameter in a data store local to the node. Further, the node may determine a node transmission parameter based on the local reception parameter. In some embodiments, the computing device may provide the local reception parameter to another computing device based on a gossip protocol. For example, in the proxy server-node architecture, the server and/or proxy server may determine a local reception parameter and provide the local reception parameter to a corresponding server or proxy server based on a gossip protocol. Further, in the server-node architecture, the server may determine a local reception parameter and provide the local reception parameter to another server based on a gossip protocol.

At block 414, the computing device may transmit data (e.g., a packet of data) to a node of the one or more nodes based on the local transmission parameter. Transmitting the data may further be based on a node reception parameter associated with the node. The computing device may transmit data to the node such that the minimum of the local transmission parameter and the node reception parameter is not exceeded. For example, if the local transmission parameter is restricted to five kilobytes of unacknowledged data and the node reception parameter is restricted to four kilobytes of unacknowledged data, the computing device may transmit four kilobytes before receiving an acknowledgement from the node.

At block 416, the computing device may obtain data (e.g., a responsive packet of data) from the node based on the local reception parameter. Obtaining the data may further be based on a node transmission parameter associated with the node. The computing device may obtain data from the node such that minimum of the local reception parameter and the node transmission parameter is not exceed. For example, if the local reception parameter is restricted to seven kilobytes of unacknowledged data and the node transmission parameter is restricted to ten kilobytes of unacknowledged data, the node may transmit seven kilobytes before receiving an acknowledgement from the computing device.

Figure 5:
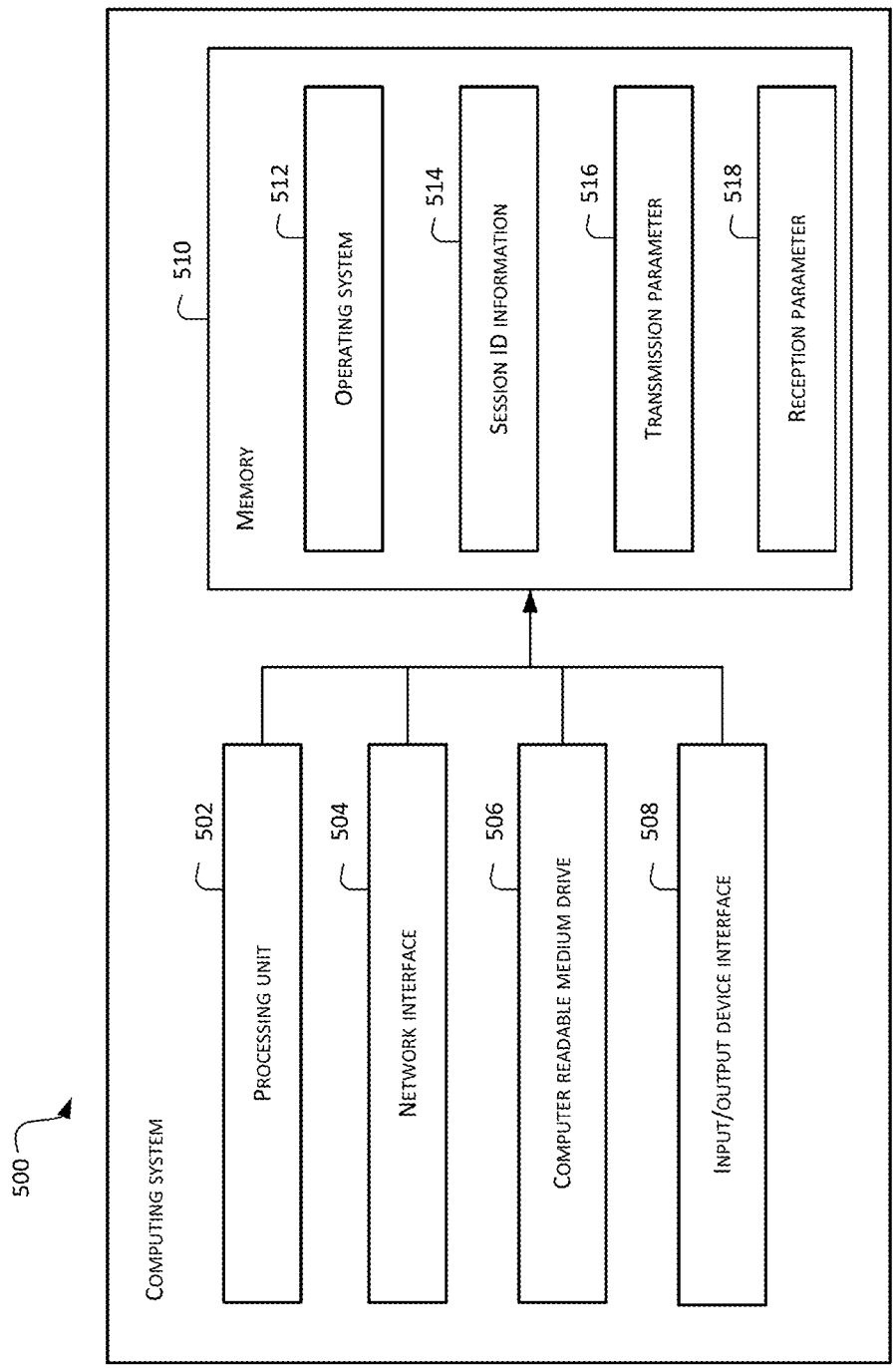
FIG. 5 shows an example computing device that may be used to implement aspects of the present disclosure.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; an input/output device interface 508, such as an input output ("IO") interface in communication with one or more microphones; and one or more computer-readable memories 510, such as RAM and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer-readable memory 510, etc.

The computer-readable memory 510 may include computer program instructions that the computer processor 502 executes in order to implement one or more embodiments. The computer-readable memory 510 can store an operating system 512 that provides computer program instructions for use by the computer processor 502 in the general administration and operation of the computing system 500. The computer-readable memory 510 can further include computer program instructions and other information for implementing aspects of the present disclosure. For example, in one embodiment, the computer-readable memory 510 may include session identifier information 514. As another example, the computer-readable memory 510 may include a transmission parameter 516. Further, the computer-readable memory 510 may include a reception parameter 518. In some embodiments, multiple computing systems 500 may communicate with each other via their respective network interfaces 504, and can implement multiple sessions each session with a corresponding connection parameter (e.g., each computing system 500 may execute one or more separate instances of the processes 400), in parallel (e.g., each computing system 500 may execute a portion of a single instance of a process 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), fullerasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a plurality of nodes, wherein each node of the plurality of nodes comprises one or more processors and computer-readable memory, and
   a server comprising one or more processors and computer-readable memory, the server configured to:
   establish a network communication session with the plurality of nodes, the network communication session associated with a session identifier identifying the network communication session, wherein each node of the plurality of nodes is configured to transmit data to the server and receive data from the server;
   based at least in part on the session identifier, obtain, from the plurality of nodes, a plurality of reception parameters of the plurality of nodes, each reception parameter of the plurality of reception parameters corresponding to a respective node of the plurality of nodes, each reception parameter indicating a respective quantity of unacknowledged data permitted to be transmitted to a respective node of the plurality of nodes;
   determine a minimum transmission parameter of the server based at least in part on the plurality of reception parameters of the plurality of nodes;
   update a server transmission parameter of the server based at least in part on the minimum transmission parameter, wherein the server transmission parameter indicates a first quantity of unacknowledged data that the server is permitted to transmit to each node of the plurality of nodes;
   update a server reception parameter of the server based at least in part on the server transmission parameter, wherein the server reception parameter indicates a second quantity of unacknowledged data that is permitted to be transmitted to the server;
   provide the server reception parameter to the plurality of nodes, wherein a first node of the plurality of nodes determines an updated first reception parameter based at least in part on the server reception parameter and a second node of the plurality of nodes determines an updated second reception parameter based at least in part on the server reception parameter;
   receive one or more of the updated first reception parameter or a transmission parameter of the first node from the first node;
   receive one or more of the updated second reception parameter or a transmission parameter of the second node from the second node;
   transmit data to the first node based at least in part on the server transmission parameter and the updated first reception parameter;
   transmit data to the second node based at least in part on the server transmission parameter and the updated second reception parameter;
   receive data from the first node based at least in part on the server reception parameter and the transmission parameter of the first node; and
   receive data from the second node based at least in part on the server reception parameter and the transmission parameter of the second node.

2. The system of claim 1, wherein the server is further configured to provide the server transmission parameter to a second server based at least in part on a gossip protocol.

3. The system of claim 1, wherein the server is further configured to:
  generate an updated server transmission parameter based at least in part on a transmission control protocol ("TCP") congestion control algorithm;
  transmit data to the first node based at least in part on the updated server transmission parameter and the updated first reception parameter; and
  transmit data to the second node based at least in part on the updated server transmission parameter and the updated second reception parameter.

4. The system of claim 1, wherein the server is further configured to:
  determine that congestion has occurred based at least in part on transmitting data to the first node;
  determine an updated minimum transmission parameter of the server based at least in part on the congestion;
  set an updated server transmission parameter of the server based at least in part on the updated minimum transmission parameter;
  determine an updated server reception parameter of the server based at least in part on the updated server transmission parameter;
  provide the updated server reception parameter to the plurality of nodes, wherein the first node updates the updated first reception parameter based at least in part on the updated server reception parameter and the second node updates the updated second reception parameter based at least in part on the updated server reception parameter;
  transmit data to the first node based at least in part on the updated server transmission parameter and the updated first reception parameter;
  transmit data to the second node based at least in part on the updated server transmission parameter and the updated second reception parameter;
  receive data from the first node based at least in part on the updated server reception parameter and the transmission parameter of the first node; and
  receive data from the second node based at least in part on the updated server reception parameter and the transmission parameter of the second node.

5. A computer-implemented method comprising:
  under control of a computing system comprising one or more processors configured to execute specific instructions,
    receiving, from a first node of a plurality of nodes, a first connection parameter of the first node, wherein the first connection parameter is received over a first network connection associated with a network communication session, and wherein the first connection parameter indicates a first quantity of unacknowledged data permitted to be transmitted to or from the first node over the first network connection;
    receiving, from a second node of the plurality of nodes, a second connection parameter of the second node, wherein the second connection parameter is received over a second network connection associated with the network communication session, and wherein the second connection parameter indicates a second quantity of unacknowledged data permitted to be transmitted to or from the second node over the second network connection;
    updating a first local transmission parameter of the computing system based at least in part on an analysis of the first connection parameter and the second connection parameter;
    updating a first local reception parameter of the computing system based at least in part on the first local transmission parameter;
    transmitting the first local reception parameter to the first node and the second node, wherein the first node determines an updated first connection parameter of the first node based at least in part on the first local reception parameter and the second node determines an updated second connection parameter of the second node based at least in part on the first local reception parameter;
    receiving the updated first connection parameter from the first node;
    receiving the updated second connection parameter from the second node; and
    receiving data from:
      the first node based at least in part on the first local reception parameter and the updated first connection parameter, and
      the second node based at least in part on the first local reception parameter and the updated second connection parameter.

6. The computer-implemented method of claim 5, further comprising:
  transmitting data associated with the network communication session to the first node based at least in part on the first local transmission parameter and the updated first connection parameter; and
  transmitting data associated with the network communication session to the second node based at least in part on the first local transmission parameter and the updated second connection parameter.

7. The computer-implemented method of claim 5, wherein the first connection parameter comprises one of:
  a node reception parameter of the first node representing a quantity of unacknowledged data permitted to be transmitted to the first node over the first network connection; or
  a node transmission parameter of the first node representing a quantity of unacknowledged data permitted to be transmitted from the first node over the first network connection.

8. The computer-implemented method of claim 5, further comprising transmitting the first local transmission parameter to the first node, wherein the first node sets a second local transmission parameter of the first node based at least in part on the first local transmission parameter.

9. The computer-implemented method of claim 5, the method further comprising:
  establishing the network communication session with the first node and the second node, wherein establishing the network communication session comprises:
    determining a session identifier for the network communication session;
    exchanging the session identifier with the first node during a first initial handshake with the first node; and
    exchanging the session identifier with the second node during a second initial handshake with the second node.

10. The computer-implemented method of claim 9, wherein establishing the network communication session further comprises using one of:
- a peer-to-peer architecture, wherein the computing system is a node of the plurality of nodes;
- a server-node architecture, wherein the computing system is a server in communication with at least a subset of the plurality of nodes; or
- a proxy server-node architecture, wherein the computing system is a proxy server in communication with a server and at least a subset of the plurality of nodes.

11. The computer-implemented method of claim 9, wherein establishing the network communication session further comprises establishing one of: a video conference network communication session or a multi-player game network communication session.

12. The computer-implemented method of claim 5, wherein updating the first local reception parameter based at least in part on the first local transmission parameter comprises updating the first local reception parameter as a function of the first local transmission parameter, wherein the function comprises multiplying the first local transmission parameter by a factor or adding a quantity to the first local transmission parameter.

13. The computer-implemented method of claim 5, wherein receiving the data from the first node and the second node comprises limiting, based on the first local transmission parameter, an amount of unacknowledged data transmitted over each network connection of a plurality of network connections associated with the network communication session, wherein the plurality of network connections includes the first network connection and the second network connection.

14. The computer-implemented method of claim 5, the method further comprising:
- determining that congestion over the first network connection has occurred;
- generating an updated first local transmission parameter of the computing system based at least in part on the congestion;
- generating an updated first local reception parameter of the computing system based at least in part on the updated first local transmission parameter;
- transmitting the updated first local reception parameter to the first node and the second node, wherein the first node updates the updated first connection parameter based at least in part on the updated first local reception parameter and the second node updates the updated second connection parameter based at least in part on the updated first local reception parameter;
- transmitting data associated with the network communication session to the first node based at least in part on the updated first local transmission parameter and the updated first connection parameter;
- transmitting data associated with the network communication session to the second node based at least in part on the updated first local transmission parameter and the updated second connection parameter;
- receiving additional data from the first node based at least in part on the updated first local reception parameter and the updated first connection parameter; and
- receiving additional data from the second node based at least in part on the updated first local reception parameter and the updated second connection parameter.

15. A system comprising a plurality of computing devices, wherein each computing device of the plurality of computing devices comprises one or more processors and computer-readable memory, and wherein a first computing device of the plurality of computing devices is configured to:
- receive, from a second computing device of the plurality of computing devices, a first connection parameter of the second computing device, wherein the first connection parameter is received over a first network connection associated with a network communication session, and wherein the first connection parameter indicates a first quantity of unacknowledged data permitted to be transmitted to or from the second computing device over the first network connection;
- receive, from a third computing device of the plurality of computing devices, a second connection parameter of the third computing device, wherein the second connection parameter is received over a second network connection associated with the network communication session, and wherein the second connection parameter indicates a second quantity of unacknowledged data permitted to be transmitted to or from the third computing device over the second network connection;
- update a first local transmission parameter of the first computing device based at least in part on an analysis of the first connection parameter and the second connection parameter;
- update a first local reception parameter of the first computing device based at least in part on the first local transmission parameter;
- transmit the first local reception parameter or the first local transmission parameter to the second computing device and the third computing device, wherein, based at least in part on the first local reception parameter or the first local transmission parameter, the second computing device determines an updated first connection parameter of the second computing device and the third computing device determines an updated second connection parameter of the third computing device;
- receive the updated first connection parameter from the second computing device;
- receive the updated second connection parameter from the third computing device; and
- transmit a first portion of data associated with the network communication session to the second computing device based at least in part on the first local transmission parameter and the updated first connection parameter and a second portion of data associated with the network communication session to the third computing device based at least in part on the first local transmission parameter and the updated second connection parameter.

16. The system of claim 15, wherein the first connection parameter comprises one of:
- a second local reception parameter of the second computing device representing a quantity of unacknowledged data permitted to be transmitted to the second computing device over the first network connection; or
- a second local transmission parameter of the second computing device representing a quantity of unacknowledged data permitted to be transmitted from the second computing device over the first network connection.

17. The system of claim 15, wherein the first computing device is further configured to:
- establish the network communication session with the second computing device and the third computing device, wherein, to establish the network communication session, the first computing device is further configured to:

determine a session identifier for the network communication session;

exchange the session identifier with the second computing device during a first initial handshake with the second computing device; and exchange the session identifier with the third computing device during a second initial handshake with the third computing device.

18. The system of claim 17, wherein, to establish the network communication session, the first computing device uses one of:

a peer-to-peer architecture, wherein the first computing device, the second computing device, and the third computing device are nodes of a plurality of nodes;

a server-node architecture, wherein the first computing device is a server in communication with the second computing device and the third computing device, wherein the second computing device and the third computing device are nodes of a plurality of nodes; or a proxy server-node architecture, wherein the first computing device is a proxy server in communication with the second computing device and the third computing device, wherein the second computing device is a server and the third computing device is a node of a plurality of nodes.

19. The system of claim 15, wherein the first computing device is further configured to:

determine that congestion over the first network connection has occurred based at least in part on transmitting data to the second computing device;

generate an updated first local transmission parameter of the first computing device based at least in part on the congestion;

generate an updated first local reception parameter of the first computing device based at least in part on the updated first local transmission parameter;

transmit the updated first local reception parameter to the second computing device and the third computing device, wherein the second computing device updates the updated first connection parameter based at least in part on the updated first local reception parameter and the third computing device updates the updated second connection parameter based at least in part on the updated first local reception parameter;

transmit a first portion of additional data associated with the network communication session to the second computing device based at least in part on the updated first local transmission parameter and the updated first connection parameter and a second portion of additional data associated with the network communication session to the third computing device based at least in part on the updated first local transmission parameter and the updated second connection parameter; and receive data from the second computing device based at least in part on the updated first local reception parameter and the updated first connection parameter and data from the third computing device based at least in part on the updated first local reception parameter and the updated second connection parameter.

20. The system of claim 15, wherein the first computing device is a first proxy server, wherein a fourth computing device of the plurality of computing devices is a second proxy server, and wherein the first computing device is further configured to:

transmit one or more of the first local reception parameter or the first local transmission parameter to the fourth computing device based at least in part on a gossip protocol.

* * * * *